United States Patent [19]

Lespade et al.

[11] Patent Number: 5,126,087
[45] Date of Patent: Jun. 30, 1992

[54] METHOD OF MANUFACTURING A COMPOSITE MATERIAL WITH VITROCERAMIC OR CERAMIC MATRIX USING A SOL-GEL PROCESS

[75] Inventors: Pierre Lespade, Merignac; Alain Guette, Bouscat; Erik Menessier, Talence; Roger Naslain, Pessac; René Paillier, Cestas, all of, France

[73] Assignee: Aerospatiale Societe Nationale Industrielle, Paris, France

[21] Appl. No.: 287,465

[22] Filed: Dec. 20, 1988

[30] Foreign Application Priority Data

Dec. 23, 1987 [FR] France ............................. 87 18023

[51] Int. Cl.⁵ ........................ B23B 3/26; B29C 67/00
[52] U.S. Cl. ................................. 264/60; 264/136; 264/137; 427/370; 427/379; 427/380
[58] Field of Search ............... 264/134, 136, 137, 60; 252/315.6, 315.7; 501/12, 95; 427/370, 379, 380

[56] References Cited

U.S. PATENT DOCUMENTS 4,460,639  7/1984  Chi et al. ............................ 428/224
4,642,271  2/1987  Rice .................................... 428/698

OTHER PUBLICATIONS

Osaka et al, "Sodium Borosilicate Glasses Prepared by The Sol-Gel Proces", *Journal of Non-Crystalline Solids* vol. 100, Nos. 1-3, Mar. 1988, p. 412.

Villegas et al, "Hydrolytic Resistance of $Na_2O$—$B_2O_3$—$SiO_2$ Gels Prepared by Sol-Gel Process", *Journal of Non-Crystalline Solids* vol. 100, Nos. 1-3, Mar. 1988 p. 460.

*Primary Examiner*—James Lowe
*Assistant Examiner*—Christopher A. Fiorilla
*Attorney, Agent, or Firm*—Hodgson, Russ, Andrews, Woods & Goodyear

[57] ABSTRACT

A method of manufacturing a composite material formed of a fibrous reinforcement and a silica based ceramic or vitro-ceramic matrix. The method includes impregnating the fibrous reinforcement by means of a sol-gel process wherein premature crystallization of the matrix obtained from the sol is hindered by addition to the sol of a crystallization retarding agent, and hot pressing the resulting material. The composite material formed has a residual porosity without the addition of nucleating agents of about less than 10%.

21 Claims, No Drawings

METHOD OF MANUFACTURING A COMPOSITE MATERIAL WITH VITROCERAMIC OR CERAMIC MATRIX USING A SOL-GEL PROCESS

BACKGROUND OF THE INVENTION

1. Field of the Invention

The present invention relates generally to the manufacture of composite materials and more particularly composite materials with fibrous reinforcements and with vitro-ceramic or ceramic matrix obtained by using a solgel process.

The term vitro-ceramic as used herein, means the matrix is maintained at the vitreous state, i.e. having a rehological behavior facilitating shaping of the material so that it is possible to control the degree of ceramization desired.

Composite materials of the vitro-ceramic-ceramic or ceramic-ceramic type are generally used in the aeronautics and spatial fields for applications requiring good resistance at average or high temperatures, i.e. from about 600° to 2500° C. It is a question for example of carbon-carbon brakes, nozzle necks, heat protection materials.

Composite ceramic-ceramic materials may also be used for certain parts of motor vehicle engines such as turbo compressor rotor, heat exchanger, piston, transmission shafts etc.

2. Description of the Prior Art

Numerous authors have sought to prepare such materials.

Thus, an article by S. R. LEVITT "High strength graphite-fibre/lithium alumino-silicate" J. Materials Science, 8 (1973). 793) describes ceramic matrix composite materials of a composition $Li_2OAl_2O_3nSiO_2$ where n=3, 4, 8 and with unidirectional reinforcement.

Similarly, an article by K. M. PREWO and J. J. BRENNAN "Silicon carbide fiber reinforced glass-ceramic matrix composites exhibiting high strength and toughness" J. Materials Science 17 (1982) 2371) describes ceramic matrix composites of composition $Li_2OAl_2O_34SiO_2$ and with silicon carbide reinforcement, whose production requires very high temperatures (1300°-1600° C.) at a pressure of 7 MPa.

In the French patent n° 2 521 982 the author describes the preparation of a ceramic-ceramic composite material of the alumina-alumina type using alumina fibers and an alumina sol. The materials of the French patent 2 521 982 have a high residual porosity.

All these approaches for preparing composite ceramic materials use two techniques.

A technique in which the fibrous preform is impregnated with a barbotine (solid phases dispersed in a liquid), this preform thus impregnated then being densified by a hot pressing treatment. This technique requires pressing temperatures higher than 1200° C.

A technique in which the fibrous preform is impregnated by a sol-gel process; the sol consists of a colloidal solution and the gel is formed of agglomerates of elementary particles whose size is about 100 Å and which are disposed in a more or less compact way. Such impregnation may, in some cases, be followed by a hot pressing treatment. Such heat treatment, in the case where no pressure is applied, makes it possible to obtain well densified materials. A residual porosity of at least 20% very often appears. In the case where the impregnation is followed by a hot pressing treatment the temperatures used for obtaining a dense ceramic material are higher than 1100° C.

The applicant has perfected a new method of manufacturing composite ceramic matrix materials using a sol-gel process which makes it possible:

to maintain a vitreous phase during the densification step by hot pressing at a temperature much lower than those used up to now and, to obtain a dense ceramic matrix (residual porosity rate $V_P \leq 10\%$ even 5%) in which the ceramization does not require the addition of a nucleating agent such for example as $TiO_2$, $ZrO_2$ or $P_2O_5$.

The production of composite materials prepared in accordance with the invention from carbon, silicon carbide, alumina and alumino-silica fibers and a sol combines the impregnation technique using a sol-gel process and the densification technique using hot pressing treatment at a temperature less than 1100° C.

It is known that the ceramics obtained by a sol-gel process tend to crystallize at a low temperature, a prejudicial property when it is a question of densifying a fibrous preform insofar as a premature crystallization prevents a material being obtained with low residual porosity. The characteristic of the invention is to have discovered that the introduction of a crystallization retarding agent in the sol makes it possible to maintain the vitreous phase during the material densification step and to obtain a material with low residual porosity without using a nucleating agent.

SUMMARY OF THE INVENTION

The invention has then as object a method of manufacturing, a composite material using a sol-gel process and a hot pressing step, said material being formed of a fibrous reinforcement and a silica based ceramic or vitro-ceramic matrix, characterized in that the premature crystallization of the matrix obtained from the sol is hindered by the addition to the sol of a crystallization retarding agent.

The method of the invention makes it possible to obtain materials of low residual porosity whose thermomechanical strength is kept for temperatures higher than 600° C.

This method comprises the following steps:

a) impregnation of a fibrous reinforcement by a sol prepared from an aqueous silica suspension, a metal salt solution and a solution containing a crystallization retarding agent, b) drying of the thus impregnated fiber reinforcement, c) repetition of the impregnation-drying steps until a prepreg is obtained having the desired fiber volume fraction, d) pyrolysis of the prepreg for a sufficiently long time for removing the gases formed by chemical reaction, e) hot pressing and cooling without pressure to the ambient temperature.

A thermal post-treatment, with or without pressure, called ceramization may be carried out at temperatures higher than the hot pressing temperature. It makes it possible to obtain a material having a better thermomechanical strength by transforming the vitreous matrix more or less completely into ceramic.

The sol is prepared from an aqueous solution of silica containing preferably a high rate of silica so as to limit the number of impregnations, and more particularly commercial sols with about 40% by weight of silica.

The metal salts contained in the sol are chosen from the salts such as lithium and aluminium salts and more particularly their nitrates.

The crystallization retarding agent used preferably is boric anhydride added to the sol in the form of a precursor.

This oxide, which has a low melting point (470° C.), is eliminated to a great extent during the hot pressing step by combining with the lithium oxide and the water and/or by being integrated in the crystalline network for the remaining part, the fibrous reinforcement serving as a privileged path for such elimination. Thus, the boron oxide facilitates the densification of the composite material without appreciably lowering its refractory character.

The boric anhydride content of the sol is preferably between 10 and 30% by weight and more particularly is about 17% by weight (with respect to the silica). The boric anhydride precursor is chosen from boric acid and the soluble borates, particularly ammonium borates and more particularly ammonium tetraborate.

In any case, the composition of the sol depends on the composition of the desired crystallized phase or phases and on the amount of boric anhydride to be added so that the vitreous phase may appear during the densification step, the overall concentration of the sol being limited by the solubility of the different products.

The pH of the sol is acid, e.g. between 1 and 2, which promotes wetting of the fibrous reinforcement. If the pH is greater than 3.5, the sol becomes unstable and gels. The overall concentration of the sol in oxide equivalent has an influence on the fiber volume fraction of the composite. Such concentration may be increased by raising the temperature of the sol.

Furthermore, it may be advantageous to incorporate in the sol fillers in the form of whiskers or particles which are reactive or not with the matrix.

The fibers forming the fibrous reinforcement are chosen from ceramic fibers and particularly carbon, silicon carbide, alumina and alumino-silica fibers. The fiber volume fraction in the composite is between 20 and 70%.

The fiber used may be unidirectional and continuous or in the form of fabrics, non woven mats or else multidirectional preforms.

The fibrous reinforcement, in the form of fibers, fabrics or preforms, is desized before impregnation. Before the sol impregnation step, it may receive a surface treatment or be coated with a deposit of an appropriate nature if it is desired to weaken the fiber-matrix bond so as to increase the toughness of the composite and/or to protect the fiber against the aggressiveness of the matrix. Thus, they may be coated with a deposit formed of a product with a lamellar or foliated character, such as pyrocarbon, as is well known to a man skilled in the art.

The impregnation may be carried out in a single step, by in situ gelling of the sol, induced by increasing the temperature or modifying the pH.

The impregnation-drying cycles make it possible to control the fiber rate. The product obtained at the end of these cycles is called a prepreg: it keeps sufficient flexibility to be shaped.

By pyrolysis of the prepreg, the volatile products are eliminated which are released by the reactions breaking down the metal salts into oxides. This step is carried out at a temperature from 200° to 600° C., for a time sufficient for removing the gases formed by chemical reaction. It may possibly be preceded by a dehydration step, carried out at a temperature of about 100° C.

The pyrolysed prepreg is then densified and ceramized by a hot compression step. This step is of variable duration depending on the type and dimensions of the material, typically from 1 to 3 hours. It may be carried out in a vacuum, in a controlled atmosphere or in air, depending on the nature of the fibrous reinforcement. The temperature at which this step is carried out is between 600° and 900° C. at a pressure less than 50 MPa. Furthermore, it may be advantageous to provide two temperature levels.

The composite thus obtained is then cooled without pressure.

A post-treatment, called ceramization, may be carried out at temperatures greater than the hot compression temperature for obtaining a material having a better thermomechanical strength by transforming the residual vitreous part of the matrix more or less completely into ceramic.

Thus, in a particular embodiment, the pyrolysed prepreg may be subjected to the following treatment: heating without pressure up to the vitreous transition temperature of the matrix following pyrolysis of the preimpregnate, pressing at the glass transition temperature of the matrix, raising the temperature under pressure up to a value in the range 800°–1000° C. so as to improve the densification state, partially eliminate the crystallization retarding agent and give to the matrix of the composite the desired ceramization degree.

MORE DETAILED DESCRIPTION OF THE INVENTION

The invention will now be illustrated by a few examples which in no way limit its scope.

EXAMPLE 1

A sol containing 90.13 g of aqueous silica suspension (LUDOX AS40 from the firm DUPONT DE NEMOURS), 20.68 g of lithium nitrate, 112.54 g of aluminium nitrate and 13.17 g of ammonium tetraborate in 240 cm$^3$ of water is prepared and its pH is adjusted to 1.

Ten high modulus carbon fiber fabrics (grade M40 of the firm TORAY), desized at 550° C. for 10 minutes are impregnated by the sol then dried at ambient temperature. This impregnation-drying cycle is reproduced seven times. The prepreg is then dehydrated at 100° C. for one hour. The hot pressing step is carried out at 900° C. for 30 mins. A uniaxial pressure of 12.5 MPa is applied progressively from 500° C. until the end of the hot pressing step. During cooling, the pressure is relaxed. The fiber volume fraction is 63%, the residual porosity rate 5% and the density 1.76 g/cm$^3$. The crystalline phase appearing during ceramization is $\beta$ spodumene. Analysis further shows that the matrix contains practically no $B_2O_3$.

The mechanical characteristics of the material are, for a three point bending test (with a span of 22)
Elastic modulus E = 170 GPa
Failure stress $\sigma_R$ = 235 MPa The heat expansion coefficient of the material is 18 $10^{-7}$°C.$^{-1}$ for temperatures higher than 300° C. The maximum temperature of use of this material is 830° C. In the case where the material is treated in an ammonia atmosphere, for two hours at a temperature of 800° C., the maximum temperature of use is increased to 950° C.

EXAMPLE 2

A composite material was manufactured from sol prepared as described in example 1 and silicon carbide fibers (fibers commercialized by the firm NIPPON CARBON under the trademark NICALON). The impregnation-drying procedure is the same as in example 1.

The prepreg thus prepared is then pyrolysed at 600° C. for ½ hour. The hot pressing step, using the same technique as for example 1, was carried out with two temperature levels: a level at 625° C. for 30 mins, a level at 900° C. for 30 mins. A pressure of 25 MPa was applied from 600° C. until the end of the formation of the composite.

The fiber volume fraction in the material is 50%, the porosity rate 2% and the density 2.47 g/cm$^3$.

The three point mechanical bending tests gave (span 43):
E = 120 GPa
$\sigma_R$ = 250 MPa The crystalline phase developed in the matrix is $\beta$ spodumene.

EXAMPLE 3

A composite material was prepared from aluminosilica fibers (fibers commercialized by the firm SUMITOMO under the trademark SUMITOMO). The fibers were disposed unidirectionally in a PETRI box. The sol, whose composition is described in example 1, is then poured on these fibers. Gelling of the sol occurs after 48 hours at ambient temperature. The product obtained is then dehydrated at 100° C. for 24 hours. A prepreg is obtained. This prepreg is then pyrolysed, first of all at a temperature of 220° C. for 1 hour then at a temperature of 600° C. for ½ hour. The hot pressing cycle is similar to that for example 2. The crystalline phase developed in the matrix is $\beta$ spodumene.

The fiber volume fraction in the material is 55%, the porosity rate 5% and density 2.70 g/cm$^3$.

The mechanical properties obtained under three point bending (span 60) are:
E = 155 GPa
$\sigma_R$ = 100 MPa

EXAMPLE 4

A composite material was obtained as in example 2, except that formation of the material was stopped after the 625° C. level of the hot pressing step.

The fiber volume fraction of the material is 55%, the residual porosity 5% and the density 2.25 g/cm$^3$.

The matrix is in vitreous form since the ceramization step has not taken place.

The mechanical properties obtained during a three point bending test are (span 50):
E = 100 GPa
$\sigma_R$ = 80 MPa

EXAMPLE 5

A composite material was manufactured from the sol prepared as in example 1 and from silicon carbide fibers (fibers commercialized by the firm NIPPON CARBON under the trademark NICALON) coated with a 0.3$\mu$ thick layer of pyrocarbon obtained by chemical deposition in the vapor phase. The impregnation-drying procedure is the same as in example 2. The step for pyrolysis of the prepreg took place at a temperature of 550° C. for 30 mins in a nitrogen atmosphere.

The hot pressing step, using the same technique as in example 1, was carried out with a temperature level at 900° C. for 30 mins. A pressure of 25 MPa was applied from 800° C. until the end of formation of the composite.

The volume fiber fraction in the material is 53%, its residual porosity less than 1% and its density 2.44 g/cm$^3$. The crystalline phase developed in the material is $\beta$ spodumene.

The three point mechanical bending tests gave (span 50):
E = 135 GPa
$\sigma_R$ = 500 MPa Other tests identical to that of example 5 were carried out on other samples with different pyrocarbon interface thicknesses less than about 0.4$\mu$.

The results of the preceding tests showed that there exists a correlation between the elastic constants which decrease as a function of the thickness of the pyrocarbon within the above range. An increase of the resistances to three point bending failure as a function of the thickness of the pyrocarbon was also observed in the same range.

COMPARATIVE EXAMPLE

A sol containing 48.06 g of aqueous silica suspension (LUDOX AS 40 from the firm DUPONT DE NEMOURS), 5.51 g of lithium nitrate, 30.10 g of aluminium nitrate and 370 cm$^3$ of water is prepared and its pH adjusted to 2.

Alumina-silica fibers (fibers commercialized by the firm SUMITOMO under the trademark SUMITOMO) are impregnated with the sol, then dried for 24 hours at ambient temperature. This impregnation-drying cycle is reproduced three times. The hot pressing step takes place with two temperature levels. A level at 620° C. for two hours and a level at 850° C. for ½ hour. The pressure of 20 MPa is applied from 800° C.

The material obtained has no mechanical strength. There is no densification.

What is claimed is:

1. A method for manufacturing a composite material formed of a fibrous reinforcement and a silica based ceramic or vitro-ceramic matrix formed by crystallization, not requiring the use of a nucleating agent, said method comprising:

a) impregnating the fibrous reinforcement with a sol in a sol-gel process, the sol impregnating the fibrous reinforcement and wherein premature crystallization of the matrix obtained from the sol is hindered by the addition to the sol of an amount of a crystallization retarding agent which is sufficient for maintaining the sol in a vitreous state during the step of densification of the fibrous reinforcement and of the matrix, resulting in a product with low residual porosity when said densification is carried out at a temperature lower than 1100° C.; and b) hot pressing the fibrous reinforcement and matrix at a temperature lower than 1100° C., for carrying out the densification of said fibrous reinforcement and matrix.

2. The method as claimed in claim 1, wherein said crystallization retarding agent is boric anhydride.

3. The method as claimed in claim 2, wherein the boric anhydride content of the sol is between 10 and 30% by weight with respect to the silica.

4. The method as claimed in claim 1, wherein the reinforcement is made up of ceramic fibers selected from the group consisting of carbon, silicon carbide, alumina and alumino-silica fibers, the fiber volume fraction in the composite being from 20% to 70%.

5. The method as claimed in claim 1, wherein the fibers are unidirectional and continuous, or in the form of fabrics, non woven mats or other multidirectional preforms.

6. The method as claimed in claim 1 wherein the fibers of the reinforcement, before impregnation by the sol, undergo a surface treatment for weakening the fiber/matrix bond so as to increase the toughness of the composite or to protect the fibers against the agressiveness of the matrix or to increase the toughness of the composite and to protect the fibers against the agressiveness of the matrix.

7. The method as claimed in claim 6, wherein the surface treatment consists of a pyrocarbon deposition.

8. The method as claimed in claim 1, wherein the hot pressing is carried out at a temperature between 600° and 900° C. at a pressure less than 50 MPa.

9. A method for manufacturing a composite material formed of fibrous reinforcement and a silica based ceramic or vitro-ceramic matrix formed by crystallization, and not requiring the use of a nucleating agent, said method comprising:
    a) impregnating a fibrous reinforcement with a sol prepared from an aqueous silica suspension, a solution of metal salts and a solution containing an amount of a crystallization retarding agent, which is sufficient for maintaining the sol in a vitreous state during densification of the fibrous reinforcement and of the matrix, resulting in a product with low residual porosity when densification is carried out at a temperature lower than 1100° C.,
    b) drying the thus impregnated fibrous reinforcement,
    c) repeating the impregnating-drying steps until a prepreg is obtained having the desired fiber volume fraction,
    d) pyrolysing the prepreg for a sufficiently long time for removing the gases formed by chemical reaction, and,
    e) hot pressing said prepreg at a temperature lower than 1100° C. for carrying out its densification and cooling it without pressure down to ambient temperature.

10. The method as claimed in claim 9, wherein the metal salts are selected from the group consisting of aluminum salts and lithium salts.

11. The method as claimed in claim 10, wherein the aluminum salt is aluminum nitrate.

12. The method as claimed in claim 10, wherein the lithium salt is lithium nitrate.

13. The method as claimed in claim 9, wherein step a) is carried out only once by the impregnation of said fibrous reinforcement by said sol, followed by in situ gelling of said sol induced by increasing the temperature or modifying the pH.

14. The method as claimed in claim 9, wherein pyrolysis of the prepreg is carried out at a temperature from 200° to 600° C.

15. The method as claimed in claim 9, wherein step e) is completed by a ceramization posttreatment.

16. The method as claimed in claim 15, wherein the ceramization treatment is carried out after relaxation of the pressure.

17. The method as claimed in claim 9, wherein step e) comprises heating without pressure up to the glass transition temperature of the matrix obtained by pyrolysis of the prepreg, pressing at the glass transition temperature of the matrix and raising of this temperature under pressure up to a value between 800° and 1000° C.

18. A method for manufacturing a composite material formed of a fibrous reinforcement and a silica based ceramic or vitro-ceramic matrix formed by crystallization comprising:
    impregnating the fibrous reinforcement with a sol of a sol-gel process, the sol impregnating the fibrous material and wherein premature crystallization of the matrix obtained from the sol is hindered by addition to the sol of a crystallization retarding agent and hot pressing the fibrous reinforcement and matrix, the hot pressing being carried out at temperature lower than 1100° C. and the crystallization retarding agent being boric anhydride which is added to the sol in the form of a precursor selected from the group consisting of boric acid or borate.

19. The method as claimed in claim 18, wherein the borate is ammonium tetraborate.

20. A method for manufacturing a composite material formed of a fibrous reinforcement and a silica based ceramic or vitro-ceramic matrix formed by crystallization comprising:
    impregnating the fibrous reinforcement with a sol of a sol-gel process, the sol impregnating the fibrous material and wherein premature crystallization of the matrix obtained from the sol is hindered by addition to the sol of a crystallization retarding agent and hot pressing the fibrous reinforcement and matrix, the hot pressing being carried out at a temperature lower than 1100° C. and the overall concentration of the sol in oxide equivalent being increased by raising the temperature of the sol.

21. A method for manufacturing a composite material formed of a fibrous reinforcement and a silica based ceramic or vitro-ceramic matrix formed by crystallization comprising:
    impregnating the fibrous reinforcement with a sol of a sol-gel process, the sol impregnating the fibrous material and wherein premature crystallization of the matrix obtained from the sol is hindered by addition to the sol of a crystallization retarding agent and hot pressing the fibrous reinforcement and matrix, the hot pressing being carried out at temperature lower than 1100° C., and wherein fillers are incorporated in the sol in the form of whiskers or particles.

* * * * *